United States Patent Office 3,636,114
Patented Jan. 18, 1972

3,636,114
NOVEL QUATERNARY AMMONIUM COMPOUNDS
AND METHOD FOR PREPARATION THEREOF
Erich Tobler and Donald J. Foster, Charleston, W. Va.,
assignors to Union Carbide Corporation
No Drawing. Continuation-in-part of application Ser. No.
715,979, Mar. 26, 1965. This application July 16, 1968,
Ser. No. 745,103
Int. Cl. C07c 93/02
U.S. Cl. 260—567.6
4 Claims

ABSTRACT OF THE DISCLOSURE

Quaternary ammonium compounds containing at least one 2-hydroxy alkyl group are prepared by treating epoxy alkanes with primary or secondary amines, followed by quaternization of the tertiary amines thus obtained. The compounds possess germicidal and/or textile softening properties. The various ammonium compounds prepared comprise bis(2 - hydroxyoctadecyl)dimethylammonium chloride, bis(2 - hydroxyhexadecyl)dimethylammonium chloride, 2 - hydroxyoctadecylhexadecyldimethylammonium chloride 2 - hydroxyoctadecylbenzyl dimethylammonium chloride, 2-hydroxyoctadecyl 1-octadecoxymethyl dimethylammonium chloride, 2-hydroxydodecylbenzyl dimethylammonium chloride, bis(2-hydroxyoctyl)dimethylammonium chloride, 2-hydroxytetradecyl trimethylammonium chloride.

---

The present invention is a continuation-in-part of U.S. patent application Ser. No. 715,979, filed Mar. 26, 1968 and now abandoned.

The present invention relates to tertiary amines, quaternary ammonium compounds and a method for preparing such amines and compounds; more specifically the present invention relates to a process for the manufacture of novel hydroxylated tertiary amines and quaternary ammonium compounds as well as the compounds per se, by the reaction of a primary or secondary amine with an epoxy, preferably an 1,2-epoxy compound followed by quaternization.

The novel quaternary ammonium compounds of the present invention generally have the following formula:

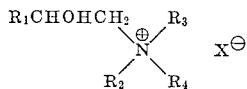

where $R_1$ is an alkyl, aryl, aralkyl, or alkaryl group, $R_2$ is selected from the group consisting of alkyl, aralkyl, alkaryl, 2-hydroxyalkyl, 1-alkoxymethyl and $R_1CHOHCH_2$ in which the alkyl and alkoxy radicals respectively have from about 1 to about 20 especially about 10 to about 20 and preferably about 14 to about 20 carbon atoms where the alkyl groups are long chains and the aryl radicals have from 6–14, especially 6–10 and preferably 6 carbon atoms; $R_3$ and $R_4$ are each selected from the group consisting of 1 to about 3 carbon alkyl e.g. methyl, ethyl, propyl, isopropyl, or 2-hydroxyethyl and 3-hydroxypropyl radicals and X is a hydroxyl or a negative salt forming atom or radical as a halide including chlorides, bromides, and iodides, methylsulfate anions, p-toluenesulfate or cyclohexylsulfate anions.

Preferred compounds are those wherein $R_1$, $R_3$ and $R_4$ are described as above and $R_2$ is selected from the group consisting of alkyl, aralkyl, alkaryl, 2-hydroxyalkyl, 1-alkoxymethyl and $R_1CHOHCH$ especially where $R_1$ and $R_2$ are long chain alkyl groups since compounds of this type are excellent fabric softeners where these alkyl groups have from about 14 to about 20 carbon atoms especially where the alkyl chain is unbranched or substantially unbranched. The compounds of this invention generally are also good germicides. Where $R_1$, $R_2$, $R_3$ and $R_4$, however, are alkyl groups as defined previously, fabric softeners are obtained if compounds having 2 medium and 2 short alkyl chains or 1 medium and 3 short alkyl chains are avoided. The terms "medium" and "short" generally refer to alkyl chains having about 10 and less than 10 carbon atoms respectively.

Another aspect of this invention relates to the manufacture of novel tertiary amines which are useful in the preparation of the novel quaternary ammonium compounds of the present invention which in turn have utility as fabric softening agents or as antibacterial compounds or germicides.

The compounds of this invention are prepared by reacting organo epoxy alkanes with primary or secondary amines to produce a tertiary amine which may be quaternized according to methods well known in the art.

The organo epoxy alkanes used in this regard may be characterized by the formula:

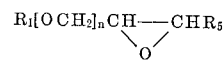

where $n=0$ or 1 preferably 0, $R_1$ has been defined previously, $R_5$ is hydrogen or $R_1$ especially alkyl and preferably hydrogen where said epoxides from contain from 3 to about 20 carbons. The epoxides may be prepared by methods well known in the art, for example, when $R_1$ is an alkyl groups and $R_5$ is hydrogen the epoxides are synthesized by epoxidizing an olefin with peracetic acid, hydrogen peroxide or the like according to the following equation:

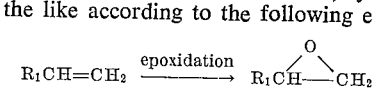

In addition to the 1,2-epoxy alkanes the epoxides may also be random epoxy alkanes such as is the case when $R_5$ is an alkyl group.

The epoxides may also be prepared by reacting an epihalohydrin such as epichlorohydrin with an alcohol especially a long chain alkanol according to the following reaction:

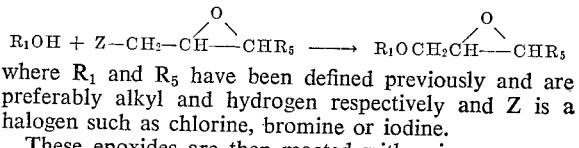

where $R_1$ and $R_5$ have been defined previously and are preferably alkyl and hydrogen respectively and Z is a halogen such as chlorine, bromine or iodine.

These epoxides are then reacted with primary or secondary amines to obtain tertiary amines according to the following equation:

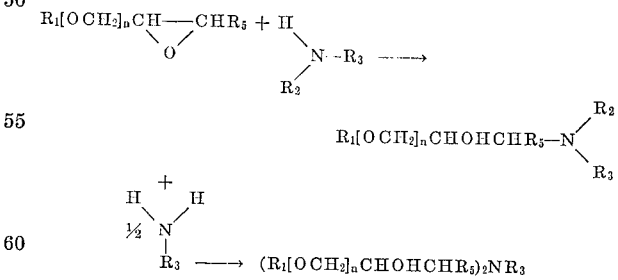

where preferably $R_1$ is an alkyl, $n$ is zero and $R_5$ is hydrogen and $R_3$ is alkyl. Thus it can be seen that tertiary amines can be obtained as the product whether primary or secondary amines are used as the reactant.

The primary or secondary amines which may be employed to obtain the tertiary amines generally comprise art known amines having from 1 to about 20 carbon atoms, preferably 1 to about 4 carbon atoms, alkyl or hydroxyl substituted alkyl amines as well as those having up to about 20 carbon atoms where the amine is substituted with one long substantially straight chain alkyl group having from about 14 to about 20 carbon atoms. Amines suitable in this regard include methylamine and dimethylamine, as well as hydroxy amines, e.g. diethanolamine but especially hydroxyl amines such as N-methylethanolamine and propanolamines such as monopropanolamine, dipropanolamine, monoisopropanolamine, and diisopropanolamine, ethanolamines including monoethanolamine, ethylethanolamine and n-butylethanolamine.

Other primary amines which are suitable in this regard include methylamine, ethylamine, n-propylamine, isopropylamine, n-butylamine, isobutylamine, sec-butylamine, tert-butylamine, n-amylamine, isoamylamine, 2-aminopentane, 2-amino-2-methylbutane, n-hexylamine, n-octylamine, n-decylamine, dodecylamine, n-tetradecylamine, cetylamine, n-octadecylamine, and allylamine. Other secondary amines which may be employed include dimethylamine, diethylamine, di-n-propylamine, diisopropylamine, di-n-butylamine, diisobutylamine, di-sec-butylamine, di-n-amylamine, diisoamylamine and methylethylamine.

The tertiary amines may be prepared from the primary or secondary amines at temperatures from about 20° to about 250° especially from about 50° and preferably from about 70° to about 150° C., at atmospheric pressure or at elevated pressures.

The tertiary amines thus prepared may be further reacted according to the method of the present invention and converted into quaternary ammonium compounds as defined above. Quaternization may be effected at temperatures from about 20° to about 110° especially from about 30° to about 90° and preferably from about 50° to about 80° C. and at pressures from about 0 to about 200, especially from about 0 to about 150, preferably from about 0 to about 100 p.s.i.g. pressure. The reaction time will vary depending upon the tertiary amine and the quaternizing agent employed and can be generally expressed as a time sufficient to permit quaternization and is well within the skill of the art.

Quaternization of the tertiary amines may be effected by contacting the tertiary amines thus prepared with any one of several quaternizing agents well known to a person having ordinary skill in the art. These quaternizing agents include methyl chloride, methyl bromide, methyl iodide, methyl sulfate, methyl acetate, methyl citrate, methyl phosphate, methyl tartrate, benzyl chloride, benzyl bromide, benzyl iodide, p-methylbenzyl chloride, p-ethylbenzyl chloride, p-methylbenzyl bromide, p-ethylbenzyl bromide, octyl chloromethyl ether, decyl chloromethyl ether, dodecyl chloromethyl ether, tetradecyl chloromethyl ether, hexadecyl chloromethyl ether and octadecyl chloromethyl ether.

The following non-limiting examples are included as illustrations of various aspects of the invention described above.

EXAMPLE I

A solution of 7.8 g. of commercial 40 percent aqueous methylamine (0.1 mole) in 150 ml. of ethanol is heated to reflux in a reaction flask provided with Dry Ice condenser, stirrer, thermometer, and addition funnel. A solution of 53.6 g. of 1,2-epoxyoctadecane (0.2 mole) in 100 ml. of ethanol is added dropwise over a one hour period to the refluxing solution. The progress of the reaction is followed by periodically withdrawing samples from the reaction mixture and analyzing for residual epoxide by vapor phase chromatography. After 6.5 hours all the epoxide is reacted. The clear solution is cooled and the white precipitate obtained is filtered to give 52.8 g. (93 percent) of crude bis(2-hydroxyoctadecyl)methylamine. After one recrystallization from ethanol, the tertiary amine (m. 72–78°) shows a purity of 98.8 percent, as determined by potentiometric titration with 0.1 N isopropanolic hydrochloric acid.

*Analysis.*—Calculated for $C_{37}H_{77}NO_2$ (percent): C, 78.24; H, 13.66; N, 2.47. Found (percent): C, 78.5; H, 13.5; N, 2.5.

A mixture of 28.4 g. of bis(2-hydroxyoctadecyl)methylamine and 250 ml. of ethanol is charged to a one liter rocker bomb, heated to 60° and pressurized with methyl chloride to 50 p.s.i.g. After 24 hours, the reaction mixture is discharged, filtered from impurities, and the filtrate taken to dryness in vacuo to afford 30 g. (97%) of crude bis(2-hydroxyoctadecyl)dimethylammonium chloride. Recrystallization from acetone containing a small amount of methanol, yields 27.6 g. of the pure product.

*Analysis.*—Calculated for $C_{38}H_{80}NO_2Cl$ (percent): C, 73.79; H, 13.04; N, 2.26; Cl, 5.73. Found (percent): C, 73.8; H, 12.8; N, 2.4; Cl, 5.6.

EXAMPLE II

A solution of 7.8 g. of commercial 40 percent aqueous methylamine in 200 ml. of ethanol is heated with 48.0 g. of 1,2-epoxyhexadecane as described in Example I. The crude product is recrystallized from a methanol-ethanol mixture to give 44.8 g. (87.5 percent) of bis(2-hydroxyhexadecyl)methylamine, m. 67–74°. Quaternization of 30.0 g. (0.0587 mole) of this tertiary amine with methyl chloride as described in Example I gives 34.3 g. of a semi-solid product. Recrystallization from acetone-hexane affords 28.5 g. (86.4 percent) of bis(2-hydroxyhexadecyl)dimethylammonium chloride.

EXAMPLE III

A solution of 65.7 g. (0.245 mole) of 1,2-epoxyoctadecane in 100 ml. of ethanol is added dropwise to a refluxing solution of 62.5 g. (0.245 mole) of hexadecyl methylamine in 250 ml. of ethanol. After a reaction time of 7 hours, the solution is filtered in the heat and cooled. The precipitate is recrystallized twice from acetone to give 109.8 g. (86 percent) of 2-hydroxyoctadecyl hexadecyl methylamine, m. 40–45° The purity, according to acid titration is 97.3 percent.

Quaternization of 52.4 g. (0.1 mole) of this tertiary amine with methyl chloride as described in Example I gives 56.5 g. (98.4 percent) of crude 2-hydroxyoctadecyl hexadecyl dimethylammonium chloride. Recrystallization from acetone containing a trace of methanol affords 54.2 g. of the pure compound.

EXAMPLE IV

A solution of 53.6 g. (0.2 mole) of 1,2-epoxyoctadecane in 100 ml. of ethanol is added dropwise to 121.9 g. of a 10 percent ethanolic dimethylamine (0.27 mole) solution at reflux. After a reaction time of 3 hours, the ethanol is evaporated in vacuo. The residue, which solidifies upon cooling in ice water, is recrystallized from hexane to give 60.8 g. (97 percent) of 2-hydroxyoctadecyl dimethylamine, m. 34–36.5°.

A mixture of 15.7 g. (0.05 mole) of 2-hydroxyoctadecyl dimethylamine, 150 ml. of ethanol, and 9.5 g. (0.075 mole) of benzyl chloride is refluxed for 5 hours. The ethanol is evaporated in vacuo and the viscous residue is treated with hexane, whereupon the 2-hydroxyoctadecyl benzyl dimethylammonium chloride solidifies. Filtration, washing with hexane to remove the excess of benzyl chloride and drying yields 18.0 g. (82 percent).

EXAMPLE V

A solution of 17.5 g. (0.055 mole) of octadecyl chloromethyl ether (obtained by treating a mixture of 1-octadecanol and paraformaldehyde with hydrogen chloride gas at 60–70°) in 100 ml. of hexane is added dropwise within 1.5 hours to a refluxing mixture of 15.7 g. (0.05 mole) of 2-hydroxyoctadecyl dimethylamine of Example IV in 200 ml. of hexane. After refluxing for an additional 1.5 hours, the clear solution is cooled, whereupon 25.9 g. (82 percent) of (2-hydroxyoctadecyl)(1-octadecoxymethyl)dimethylammonium chloride is crystallized.

EXAMPLE VI 1,2-epoxydodecane (36.8 g., 0.2 mole) is added dropwise to 180 g. of a 10 percent ethanolic dimethylamine (0.4 mole) solution at reflux temperature. After three hours all the epoxide is reacted and the mixture is distilled to give 40.7 g. (90 percent) of 2-hydroxydodecyl dimethylamine, B.P. 88–90° (0.05 mm.) $n_D^{25.5}$ 1.4460.

A mixture of 33 g. (0.144 mole) of 2-hydroxydodecyl dimethylamine, 300 ml. of ethanol, and 25.3 g. (0.2 mole) of benzyl chloride is refluxed for 5 hours. The ethanol is removed in a rotary vacuum evaporator and the viscous residue obtained treated with hexane to remove the excess of benzyl chloride. The 2-hydroxydodecyl benzyl dimethylammonium chloride (46 g.=90 percent) solidifies after a few days in a vacuum desiccator. The quaternary ammonium compound is an excellent germicide.

EXAMPLE VII 1,2-epoxyoctane (25.6 g., 0.2 mole) is treated with 7.8 g. of 40 percent aqueous methylamine (0.1 mole) solution in 150 ml. of ethanol according to Example I. The crude bis(2-hydroxyoctyl)methylamine is directly quaternized with methyl chloride (Example I) to give 32.2 g. (95.3 percent) of bis(2-hydroxyoctyl)dimethylammonium chloride as a viscous oil which is an excellent germicide.

EXAMPLE VIII

The reaction of 1,2-epoxytetradecane with a 10 percent ethanolic solution of dimethylamine gives a 90 percent yield of 2-hydroxytetradecyl dimethylamine, B.P. 120–122° (0.05 mm.) $n_D^{24.5}$ 1.4490.

Quaternization of 36.0 g. (0.14 mole) with methyl chloride affords 41.1 g. (95.5 percent) of crude 2-hydroxytetradecyl trimethylammonium chloride which is an excellent germicide. The product is purified by recrystallization from acetone containing a small quantity of methanol.

EXAMPLE IX

To a stirred mixture of 96.8 g. of 1-hexadecanol (0.4 mole), 200 ml. of xylene, and 56.2 g. of epichlorohydrin (0.6 mole) is added 1 ml. of antimony pentachloride at room temperature. An exothermic reaction sets in and after 20 minutes the reaction mixture reaches a maximum temperature of 70°. Vapor phase chromatography of a sample taken after a reaction time of one hour indicates that all the hexadecanol reacts. After standing over night the reaction mixture containing the 3-hexadecoxy-2-hydroxy-1-chloropropane is refluxed with a solution of 24 g. of sodium hydroxide (0.6 mole) in 100 ml. of water for 2 hours. After cooling the water layer is removed and the organic layer distilled to give 83.5 g. (70 percent) of 1,2-epoxy-3-hexadecoxypropane, B.P. 150–155° (0.2 mm.), M.P. 26–27°.

A solution of 9.0 g. of commercial 40 percent aqueous methylamine in 150 ml. of ethanol is heated with 62.8 g. of 1,2-epoxy-3-hexadecoxypropane in 100 ml. of ethanol as described previously. The solution is filtered while hot, the filtrate cooled, and the white precipitate filtered in the cold to give 58 g. (88 percent) of bis(3-hexadecoxy-2-hydroxypropyl)methylamine, a low melting solid.

Quaterization of 53 g. (0.0844 mole) of this tertiary amine with methyl chloride is carried out in the usual manner. The crude product is filtered, the filtrate evaporated to dryness and the residue recrystallized from acetone to give 51.9 g. (91 percent) of bis(2-hexadecoxy-2-hydroxypropyl)dimethylammonium chloride.

EXAMPLE X

The quaternary ammonium compounds in Examples I and III are evaluated as fabric softeners. Cotton flannel is washed with a commercial anionic detergent and the fabric softener (concentration=0.007 percent with respect to the wash load) added at the start of the rinse cycle. After drying the flannel is judged for "soft hand," by six operators. The results are summarized in Table I below. The "rating" is obtained by assigning to the softest hand an arbitrary multiplier of 5, to the second softest a multiplier of 4, etc. and by summation of the products.

TABLE I

| Softener | No. of times ranked | | | | | "Rating" |
|---|---|---|---|---|---|---|
| | 1st | 2nd | 3rd | 4th | 5th | |
| $(C_{18}H_{37})_2NMe_2]^+Cl^-$ | 3 | 1 | 2 | 0 | 0 | 25 |
| $(C_{16}H_{33}CHOHCH_2)_2NMe_2]^+Cl^-$ | 2 | 2 | 2 | 0 | 0 | 24 |
| $C_{16}H_{33}CHOHCH_2\overset{Me}{\underset{Me}{N}}C_{16}H_{33}]^+Cl^-$ | 1 | 3 | 1 | 0 | 0 | 20 |
| Commercial softener | 0 | 0 | 0 | 6 | 0 | 12 |
| None | 0 | 0 | 0 | 0 | 6 | 6 |
| Multiplier | 5 | 4 | 3 | 2 | 1 | |

When the epoxy compounds, primary and secondary amines previously mentioned are reacted according to the method of the present invention substantially the same results are obtained as in the foregoing examples. These compounds also have germicidal and/or textile softening properties comparable to the quaternary ammonium compounds of the examples.

What is claimed is:
1. Bis(2-hydroxyoctadecyl)dimethylammonium chloride.
2. Bis(2-hydroxyhexadecyl)dimethylammonium chloride.
3. Bis(2-hydroxyoctyl)dimethylammonium chloride.
4. Bis(3 - hexadecoxy - 2 - hydroxypropyl)dimethylammonium chloride.

References Cited

UNITED STATES PATENTS

| 3,445,440 | 5/1969 | Susi et al | 260—567.6 |
| 3,369,046 | 2/1968 | Kaniecki et al. | 260—567.6 |
| 2,775,604 | 12/1956 | Zech | 260—567.6 |
| 2,541,089 | 2/1951 | Nakawitz | 260—567.6 |
| 2,192,925 | 3/1940 | Major et al. | 260—567.6 |

OTHER REFERENCES

Protiva et al.: Chemical Abstracts, vol. 49, col. 247–250 (1955).

LEON ZITVER, Primary Examiner

M. W. GLYNN, Assistant Examiner

U.S. Cl. X.R.

260—457, 459, 567, 570.7, 576, 584 R, 584 B, 999; 252—8.75